Jan. 2, 1962   W. C. HOOKWAY   3,015,337
VALVE FOR FIRE PROTECTION
Filed March 24, 1959   2 Sheets-Sheet 2
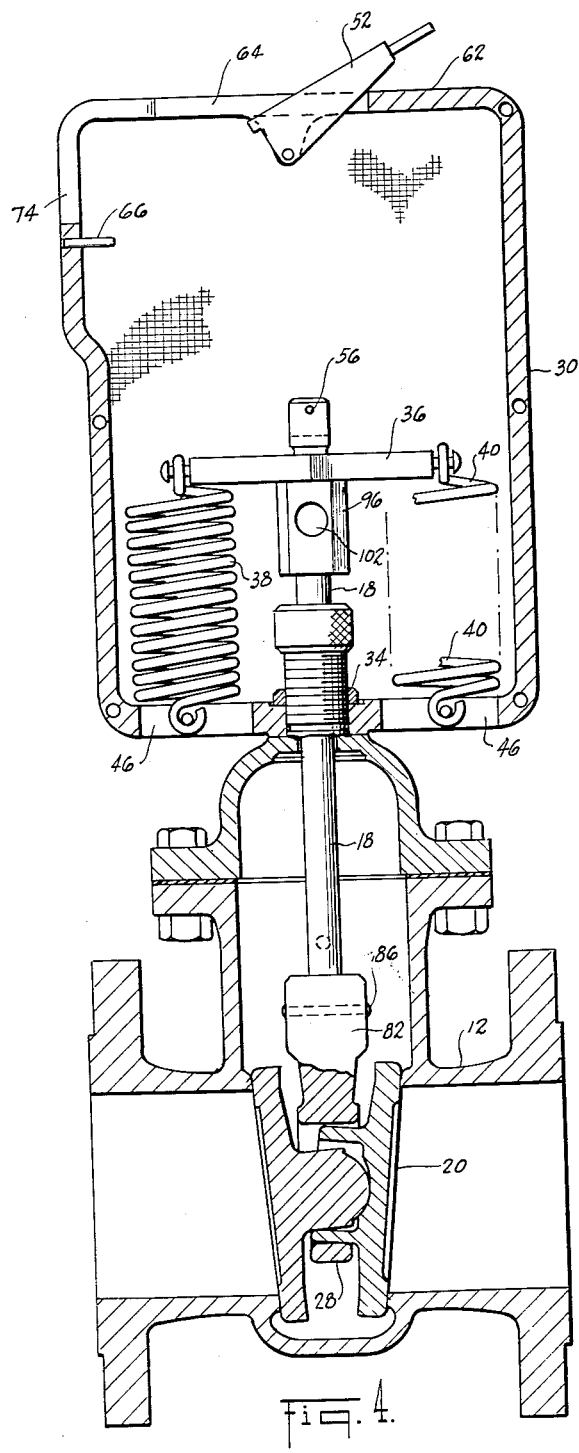
INVENTOR
WILLIAM C. HOOKWAY
BY James and Franklin
ATTORNEYS

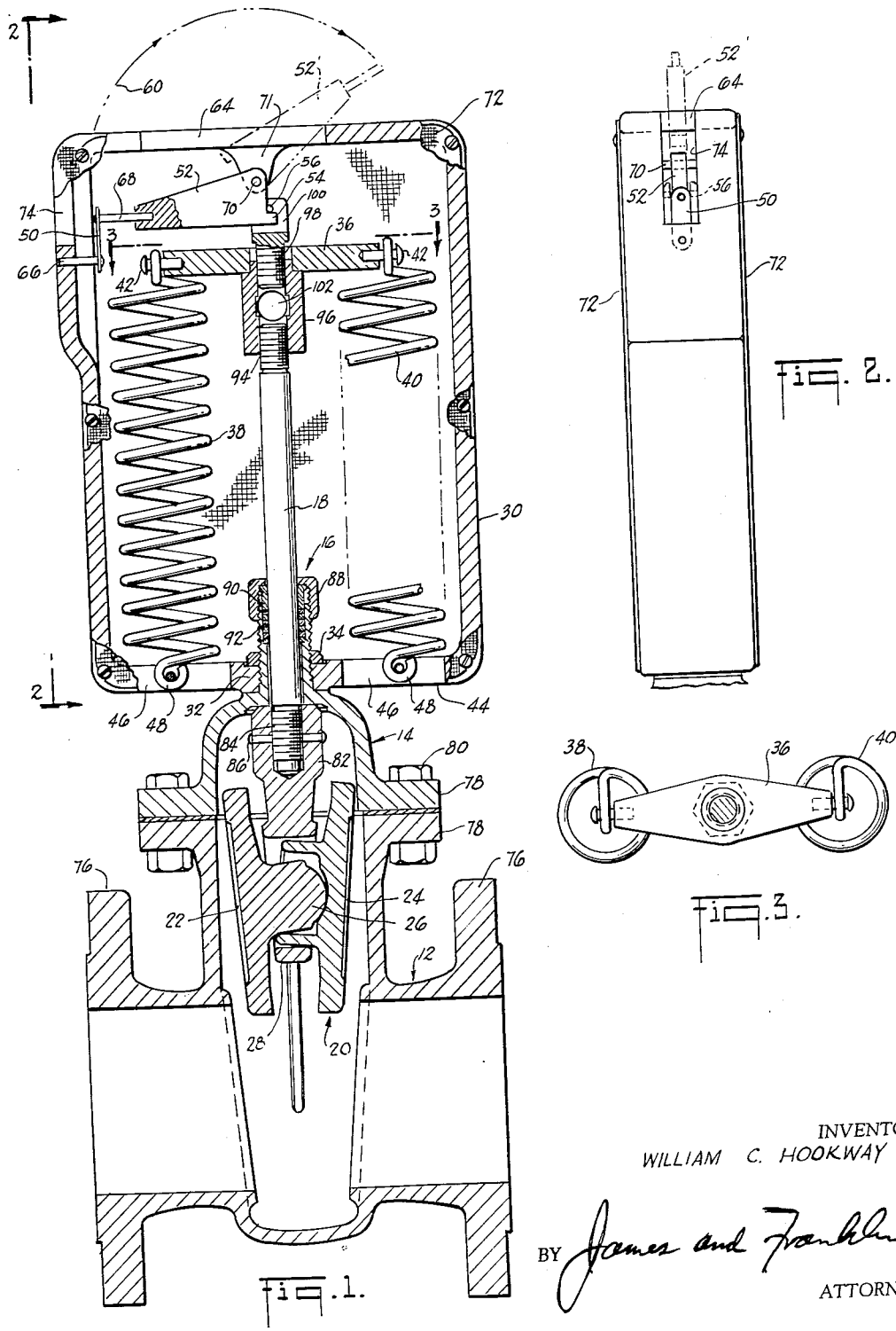

3,015,337
VALVE FOR FIRE PROTECTION

William C. Hookway, Morristown, N.J., assignor to Cooper Alloy Corporation, Hillside, N.J., a corporation of New Jersey
Filed Mar. 24, 1959, Ser. No. 801,633
3 Claims. (Cl. 137—75)

This invention relates to fire protection in plants using flammable liquids carried in pipes, and relates more particularly to a valve which automatically closes to prevent continued flow of the flammable liquid in the event of fire.

The primary object of the present invention is to generally improve cut-off valves for fire protection.

A more particular object is to provide a cut-off valve operated by resilient means so that it is independent of gravity and therefore may be positioned at any angle on pipes running in any direction.

A related object is to provide a valve which is compact and therefore may be used in locations where pipes run close to one another.

Still another object is to provide a valve the operating mechanism of which is external to the fluid carried in the pipe, thus avoiding exposure to corrosive fluids. In accordance with a related feature of the invention the valve and valve mechanism are made of corrosion resistant stainless steel, which is of advantage not only in withstanding attack by the fluids being piped, but also to avoid atmospheric corrosion with consequent "freezing" of the external working parts.

The mechanism includes a low temperature fusible link which withstands the force of the resilient means tending to close the valve. In a valve of small size, the link may withstand the closing force directly. However, in larger valves the closing force may be substantial. A further object is to retain the desired sensitivity and quick response to fire while avoiding difficulty with "cold flow" of the fusible metal.

Still another object is to provide a cut-off valve so arranged that tripping or closing of the valve is visibly signalled by exposing a normally concealed arm.

T accomplish the foregoing general objects and other more specific objects which will hereinafter appear, my invention resides in the cut-off valve elements and their relation one to another as are hereinafter more particularly described in the following specification. The specification is accompanied by drawings in which:

FIG. 1 is a vertical section through a cut-off valve embodying features of the invention;

FIG. 2 is a side elevation of the upper or yoke portion, looking in the direction of the arrows 2—2 of FIG. 1;

FIG. 3 is a horizontal section taken in the plane of the line 3—3 of FIG. 1;

FIG. 4 is a view similar to FIG. 1, but showing the relation of the parts when the valve has closed;

FIG. 5 is a fragmentary plan view of the yoke; and

FIG. 6 is a partially sectioned elevation of a simplified closing mechanism which may be used for valves of small size.

Referring to the drawing and more particularly to FIG. 1, the cut-off valve comprises a valve body 12 having a bonnet 14 and a packing gland 16. This receives a valve stem 18 which passes through the bonnet 14 and gland 16.

In preferred form, the valve is a gate valve, and the movable valve member generally designated 20 is therefore shown as a gate which is carried at the lower end of the stem 18. The particular gate here shown comprises separate and relatively movable sides 22 and 24 having pivotally nested portions at 26 carried in a support ring 28.

In accordance with the present invention, a frame or so-called yoke 30 is fixedly secured at 32 to the bonnet 14. In the present case this is done by means of a nut 34. The stem 18 carrier a cross-arm 36 within the yoke 30. The resilient means is also housed within the yoke 30, and in the present case comprises a pair of pull springs 38 and 40 which are preferably alike and are symmetrically arranged on opposite sides of the stem 18. The upper ends of the spring are connected to the ends of the cross-arm by means of pins 42, and the lower ends of the springs are connected to the bottom 44 of the yoke. In the specific construction here shown, the bottom wall 44 is slotted at 46 to receive the lower ends 48 of the springs, the latter being held by pins passing horizontally across the slots 46.

The mechanism additionally includes a fusible link 50 which, when intact, holds the cross-arm 36 in elevated position against the pull of the springs. In the present case this is done indirectly by using a fulcrum lever 52 characterized by great mechanical advantage. The lever includes detent means 54 engaging the upper end of the stem, in this case at a cross pin 56. The fusible link 50 connects the long arm of the fulcrum lever 52 to the yoke 30 and thereby prevents movement of the lever. However, it will be evident that on failure of link 50, the fulcrum lever 52 will be released to fly upward as indicated by the arcuate arrow 60. The dentent 54 releases pin 56, and the latter turns the detent as the pin moves downward.

The closed position of the valve is shown in FIG. 4 of the drawing, and it will be seen that the springs 38 and 40 have pulled the cross-arm 36 and valve stem 18 downward, thereby moving the gate 20 against its seat in valve body 12, and so cutting off flow through the valve. Meanwhile, the fulcrum lever 52 has turned beyond dead center and remains exposed above the top of the yoke. For this purpose the top wall 62 of the yoke 30 has been slotted or cut away as shown at 64. In effect, the fulcrum lever acts as a flag which signals the fact that the valve has closed.

Reverting to FIG. 1, the lower end of fusible link 50 is held by a pin 66 fixed in the yoke, and the upper end of the fusible link is slipped over a pin 68 fixed in the outer end of fulcrum lever 52. The fulcrum lever is pivoted at 70 and in the present case this pivot is located generally above and only slightly offset from the axis of the stem 17, thus giving the lever great mechanical advantage. The pivot is also located near a wall, in this case in bearings 71 on the top wall of the yoke, so that the lever 52 is exposed when thrown outward.

It will be understood that the flat sides of the yoke may be closed by side sheets 72. These are preferably held by a few small screws so that they may be readily removed. The side sheets are amply perforated, or may consist of a wire mesh as here shown, so that the tripping mechanism including the fusible link is fully exposed to the atmosphere. The fusible link is additionally exposed through an ample slot 74 cut through the upright wall of the yoke, and preferably forming an extension of the slot 64 at the top of the yoke.

The details of the valve structure may in many respects be standard. In the present case the valve body has flanges 76, but other forms of connection to the pipeline may be used. The bonnet 14 is secured to the valve body by flanges 78 and bolts 80, and an appropriate gasket may be used therebetween. The valve stem 18 is secured to the upper part 82 of the support ring 28 by means of a threaded fit 84 locked by a pin 86. The packing gland at 16 may be of any desired type, and in the present case a threaded collar 88 bears down on a gland 90 which compresses the packing 92.

The upper end of stem 18 is threadedly connected at 94 to a hexagonal fitting 96. This has a neck at the top to receive a hole through the cross-arm 36. It further receives a screw 98, the upper end of which is bifurcated at 100. The detent pin 56 extends across the bifurcation, and the detent 54 is received in the bifurcation beneath the pin.

A relatively large hole 102 is conveniently provided through the fitting 96. This facilitates resetting the valve after it has closed, because a capstan bar may be slid through the hole 102 and then may be used to exert upward force against the pull springs until the linkage has been reset with a new fusible link.

The linkage may be simplified, particularly for valves of smaller size, by permitting the fusible link to directly oppose the pull of the springs. Such an arrangement is shown in FIG. 6. The valve itself has been omitted to save space on the drawing, but it will be understood that it may be any standard valve which has a movable valve member and valve stem, and particularly and preferably a gate valve fabricated of corrosion resistant stainless steel.

The bonnet 110 of the valve has a generally rectangular yoke 112 fixedly mounted thereon at 114. The upper end of valve stem 116 carries a cross bar 118 which is pulled downward by pull springs 120. These are preferably symmetrical in dimension and location. Their lower ends are secured to the bottom 122 of the yoke in the same manner as shown in FIGS. 1 and 4 of the drawing.

The main difference is that in this case the top of the yoke has an upstanding part 124 with a cross-pin 126 carrying the upper end of a fusible link 128. The lower end of link 128 is held by a cross-pin 130 in the bifurcated upper end 132 of a fitting 134 secured to the upper end of the valve stem 116. This same fitting acts as a seat receiving the cross-arm 118.

It will be evident that on fusing of link 128, the springs 120 will pull the cross-arm and valve stem down to automatically close the valve.

For quick fire response the fusible link is preferably kept thin. The detent linkage used in FIG. 1 makes it possible to use a thin link in a larger valve, without cold flow.

The fusible link may be of any desired type, and in the present case is set to release the valve at a temperature of 160° F. The valve may be designed for the normal requirements of the pipe system in which it is to be used, and in the particular case here shown is designed to withstand a pump pressure of 150 lbs. per square inch.

The valves are particularly useful in the chemical and petroleum industries, and may be used to handle not only the usual inflammable petroleum liquids, but also flammable liquids such as ethyl mercaptan, ethyl alcohol, methanol, acrylonitrile, and methyl ethyl ketone.

It is believed that the construction and method of use of my improved cut-off valve for fire protection, as well as the advantages thereof, will be apparent from the foregoing detailed description. Because of the spring operation, the valve may be used in any position on pipes running in any direction. It will therefore be understood that reference in the foregoing description and in the claims to the valve stem extending upward from the gate, etc., is merely for convenience and is intended purely in a relative sense, with the mechanism assumed for convenience to be upright as shown in the drawings. Because of the use of corrosion resistant stainless steel, the valve may be used with liquids which are highly corrosive as well as flammable. Moreover, there is no danger of the release mechanism becoming frozen and inoperative by exposure to the atmosphere. The valve is comparatively simple and foolproof in construction, and compact in dimension.

It will be understood that while I have shown and described my invention in several preferred forms, changes may be made in the structures shown without departing from the scope of the invention as sought to be defined in the following claims.

I claim:

1. A valve control mechanism for fire protection, said mechanism being mounted on a gate valve body having a bonnet and packing gland, a gate, and a stem projecting up from the gate through the bonnet and gland, said mechanism comprising a yoke fixedly mounted on said bonnet, side walls enclosing the space within said yoke, resilient means within said yoke for urging the stem downward, a fulcrum lever of great mechanical advantage within said yoke, detent means on said fulcrum lever for engaging the upper end of the stem within said yoke to hold the stem elevated against the resilient means, a fusible link within said yoke connecting the long end of the fulcrum lever to the yoke to prevent movement thereof, whereby failure of the fusible link releases the fulcrum lever and the gate for automatic closing, the fulcrum lever pivot being disposed near a wall of the yoke and the said wall being cut away to permit the lever to fly outward, whereby closing of the gate is visibly signalled by exposure of the fulcrum lever outside the yoke.

2. A valve control mechanism for fire protection, said mechanism being mounted on a gate valve body having a bonnet and packing gland, a gate, and a stem projecting up from the gate through the bonnet and gland, said mechanism comprising a yoke fixedly mounted on said bonnet, side walls enclosing the space within said yoke, a cross-arm mounted on said stem within said yoke, a pair of pull springs symmetrically arranged within said yoke on opposite sides of the stem, the upper ends of said springs being connected to the ends of the cross-arm and the lower ends of said springs being connected to the bottom of the yoke, a fulcrum lever of great mechanical advantage within said yoke, detent means on said fulcrum lever for engaging the upper end of the stem within said yoke to hold the stem elevated against the pull of the springs, a fusible link within said yoke connecting the long end of the fulcrum lever to the yoke to prevent movement thereof, whereby failure of the fusible link releases the fulcrum lever and the gate for automatic closing, the fulcrum lever pivot being disposed near a wall of the yoke and the said wall being cut away to permit the lever to fly outward, whereby closing of the gate is visibly signalled by exposure of the fulcrum lever outside the yoke.

3. A valve control mechanism for fire protection, said mechanism being mounted on a gate valve body having a bonnet and packing gland, a gate, and a stem projecting up from the gate through the bonnet and gland, said mechanism comprising a yoke fixedly mounted on said bonnet, side walls enclosing the space within said yoke, a cross-arm mounted on said stem within said yoke, a pair of pull springs symmetrically arranged within said yoke on opposite sides of the stem, the upper ends of said springs being connected to the ends of the cross-arm and the lower ends of said springs being connected to the bottom of the yoke, a fulcrum lever within said yoke and pivoted on said yoke above and slightly offset from the upper end of the stem above the cross-arm, said lever extending horizontally to one side of the yoke, detent means on said fulcrum lever for engaging the upper end of the stem within said yoke to hold the stem elevated against the pull of the springs, and a fusible link within said yoke connecting the free end of the fulcrum lever to the yoke to prevent upward movement thereof, whereby failure of the fusible link releases the fulcrum lever and the gate for automatic closing, the fulcrum lever pivot being disposed near the top of the yoke and the said top being cut away to permit the lever to fly upward beyond dead center, whereby closing of the gate is visibly signalled by maintained exposure of the fulcrum lever above the yoke.

References Cited in the file of this patent

UNITED STATES PATENTS

| | | |
|---|---|---|
| 944,638 | Schmidt | Dec. 28, 1909 |
| 1,218,729 | Weisgerber | Mar. 13, 1917 |
| 1,592,403 | Wills | July 13, 1926 |
| 1,868,708 | Hunt | July 26, 1932 |
| 2,137,685 | Gillen | Nov. 22, 1938 |
| 2,654,395 | Kaye | Oct. 6, 1953 |
| 2,693,337 | Williamson | Nov. 2, 1954 |

FOREIGN PATENTS

| | | |
|---|---|---|
| 310,161 | Germany | Dec. 3, 1919 |
| 205,910 | Great Britain | Oct. 29, 1923 |